US007003794B2

(12) United States Patent
Arye (10) Patent No.: US 7,003,794 B2
(45) Date of Patent: Feb. 21, 2006

(54) MULTICASTING TRANSMISSION OF MULTIMEDIA INFORMATION

(75) Inventor: Ram Arye, Rishon-Le-Zion (IL)

(73) Assignee: Bamboo Mediacasting, Inc., New York, NY (US)

( * ) Notice: Subject to any disclaimer, the term of this patent is extended or adjusted under 35 U.S.C. 154(b) by 1066 days.

(21) Appl. No.: 09/790,082

(22) Filed: Feb. 20, 2001

(65) Prior Publication Data

US 2002/0002708 A1 Jan. 3, 2002

Related U.S. Application Data

(60) Provisional application No. 60/214,550, filed on Jun. 27, 2000.

(51) Int. Cl.
| | |
|---|---|
| H04N 7/173 | (2006.01) |
| H04N 7/16 | (2006.01) |
| H04H 1/04 | (2006.01) |
| H04J 1/00 | (2006.01) |
| G06F 15/16 | (2006.01) |

(52) U.S. Cl. ........................ 725/100; 725/93; 725/151; 370/468; 370/487; 370/490; 709/231; 709/232; 709/229

(58) Field of Classification Search .................. 725/73, 725/90, 93–98, 86, 87, 100, 151; 370/468, 370/487, 4, 490; 709/231, 232, 2, 229
See application file for complete search history.

(56) References Cited

U.S. PATENT DOCUMENTS

| | | | |
|---|---|---|---|
| 5,694,334 A | 12/1997 | Donahue et al. | |
| 6,014,694 A * | 1/2000 | Aharoni et al. | 709/219 |
| 6,161,137 A * | 12/2000 | Ogdon et al. | 709/224 |
| 6,185,736 B1 | 2/2001 | Ueno | |
| 6,195,680 B1 * | 2/2001 | Goldszmidt et al. | 709/203 |
| 6,263,371 B1 * | 7/2001 | Geagan et al. | 709/231 |
| 6,266,813 B1 * | 7/2001 | Ihara | 725/36 |
| 6,430,354 B1 * | 8/2002 | Watanabe | 386/46 |
| 6,611,530 B1 * | 8/2003 | Apostolopoulos | 370/442 |
| 6,651,103 B1 * | 11/2003 | Markowitz et al. | 709/231 |
| 6,745,391 B1 * | 6/2004 | Macrae et al. | 725/42 |

* cited by examiner

*Primary Examiner*—Vivek Srivastava
*Assistant Examiner*—Johnny Ma
(74) *Attorney, Agent, or Firm*—Boris G. Tankhilevich (57) ABSTRACT

A multicasting system for reception of multimedia information comprising: a content switch coupled to a multimedia content source and at least one multimedia smart terminal. The multimedia content source includes a plurality of multimedia contents, wherein each multimedia content is supported by a primary multimedia stream transmitted over a primary dedicated channel having a primary bandwidth. At least one multimedia smart terminal is configured to receive from the content switch over a network each multimedia content as a secondary multimedia stream transmitted over a secondary channel having a secondary bandwidth. The content switch includes a bandwidth scaler configured to scale each primary multimedia stream to a plurality of secondary multimedia sub-streams that are substantially synchronized. The multimedia smart terminal includes a smart terminal sub-stream switch configured to switch among the plurality of secondary multimedia sub-streams in order to select a substantially optimum secondary multimedia sub-stream. The substantially optimum secondary multimedia sub-stream includes a substantially optimum relationship between an error rate level determined at the time of reception of a multimedia content and the quality of reception of a multimedia content.

30 Claims, 5 Drawing Sheets

MULTICASTING TRANSMISSION OF MULTIMEDIA INFORMATION

This application claims the priority under the provisional Patent Application No. 60/214,550, filed on Jun. 27, 2000, and entitled: "Methods for bandwidth scaling of a compressed video stream".

BACKGROUND OF THE INVENTION

1. Field of the Invention

The present invention relates to signal processing, and more particularly, to a multicasting system for transmission of multimedia data.

2. Description of the Prior Art

In the prior art Video-on-Demand system (VOD system) for wireless transmission of real-time multimedia information, a typical VOD system includes at least one video content source, a content switch, and at least one video receiving terminal. Each VOD terminal has a dedicated channel that wirelessly sends a request via the content switch to the video content source for a desired video content. When a set of multimedia data, (for instance, a set of video file) is transmitted from the content source to a single user on a dedicated channel, the data rate can be adaptively modified based on the condition of the reception for that particular user's terminal. The better the condition of reception of the particular user's terminal the higher a bit rate at which the set of data can be transmitted to that user's terminal.

However, there are certain disadvantages associated with the prior art unicast VOD system. Indeed, for unicast system to be operational, one needs two dedicated channels for each user, one dedicated channel for reception, and one dedicated channel for continuously transmitting the condition of video reception back to the content provider. Thus, the given video content has to be transmitted over a number of channels twice as much as the number of users. Thus, the number of users is limited by the number of slots (or channels) that a wireless cell can support. A typical wireless cell is saturated very fast because the wireless cell can support only up to (5–50) video channels (that is up to (5–50) video users only), or up to (20–200) audio channels per cell, or up to (2–20) data channels per cell.

Thus, what is needed is to have a multimedia wireless system (for instance, a video system) that is free from the above-mentioned limitations. More specifically, what is needed is a multicast transmission system that can transmit data on the same channel for a plurality of smart terminals, wherein each smart terminal can independently and locally adjust the quality of received multimedia data without sending the feedback information to the content provider.

SUMMARY OF THE INVENTION

To address the shortcomings of the available art, the present invention provides a multicasting system and a multicasting method for reception of multimedia information. Before a set of data is sent over a channel, the set of data is sophisticated scaled and packed into sub-streams that are processed by a smart terminal. Each smart terminal based on its reception quality decides individually which sub-stream to use and when to switch to another sub-stream based on the changes in the reception condition. Each smart terminal also decides when and how to synchronize the switching operation between the sub-streams in order to optimize the multimedia reception by minimizing the loss of data, and by smoothing the transition between the sub-streams that are used.

One aspect of the present invention is directed to a multicasting system comprising a content switch coupled to a multimedia content source and at least one multimedia smart terminal. The multimedia content source includes a plurality N of multimedia contents, wherein each multimedia content is supported by a primary primary_bit_rate multimedia stream transmitted over a primary dedicated channel having a primary bandwidth. N is an integer.

In one embodiment of the present invention, the content switch further includes a bandwidth scaler configured to scale each primary multimedia stream transmitted at a primary high bit rate over the primary dedicated channel having the primary bandwidth to a plurality K of secondary multimedia sub-streams, wherein K is an integer. In one embodiment, the plurality K of secondary multimedia sub-streams is substantially synchronized. In an alternative embodiment, the plurality K of secondary multimedia sub-streams is not synchronized.

In one embodiment, each multimedia smart terminal is configured to receive from the content switch over a network each multimedia content as a plurality K of secondary multimedia sub-streams transmitted over a secondary channel having a secondary bandwidth.

In one embodiment, each multimedia smart terminal further includes a smart terminal sub-stream switch configured to switch among the plurality K of secondary multimedia sub-streams in order to select a substantially optimum secondary multimedia sub-stream having a substantially optimum low bit rate. The smart terminal sub-stream switch further includes a device for continuously determining a current error rate for a currently employed optimum secondary multimedia sub-stream including the substantially optimum bit rate. The optimum selected secondary multimedia sub-stream includes an optimum relationship between an error rate level determined at the time of reception and the quality of reception of a multimedia content supported by the optimum secondary multimedia sub-stream.

In one embodiment, when the plurality K of secondary multimedia sub-streams is substantially synchronized, the smart terminal sub-stream switch further comprises a synchronous smart terminal sub-stream switch. In this embodiment, the synchronous smart terminal sub-stream switch is configured to switch among the plurality K of secondary multimedia sub-streams in order to select an optimum secondary multimedia sub-stream having an optimum low bit rate.

In one embodiment, the synchronous smart terminal sub-stream switch further comprises a dynamically loaded database including a look-up table comprising the N multimedia content entries, wherein for each content entry n the look-up table further includes a k number of secondary multimedia sub-streams. For each secondary multimedia sub-stream, the look-up table further includes a lower_error_rate threshold, a higher_error_rate threshold, and a set of synchronizing data. Herein, n is an integer less or equal to N, and k is an integer less or equal to K.

In one embodiment, the synchronous smart terminal sub-stream switch further comprises a switching smart terminal sub-stream device for switching among a plurality of k available secondary multimedia sub-streams in order to select for each multimedia content a substantially optimum secondary multimedia sub-stream based on the look-up table.

If the selected optimum secondary multimedia sub-stream has a determined error rate that is higher than a predetermined higher_error_rate threshold, the smart terminal switch switches the content from the substantially optimum secondary multimedia sub-stream to a lower secondary multimedia sub-stream including a lower_low bit rate, wherein the lower_low bit rate is lower than the substantially optimum low bit rate. If, on the other hand, the substantially optimum secondary multimedia sub-stream has a determined error rate lower than a predetermined lower_error_rate threshold, the smart terminal switch switches the content from the substantially optimum secondary multimedia sub-streams to a higher secondary multimedia sub-stream including a higher_low bit rate, wherein the higher_low bit rate is lower than the substantially optimum low bit rate.

In one embodiment, the smart terminal switch further includes a device for continuously determining an error rate for the preceding_optimum secondary multimedia sub-stream. The determined error rate indicates a direction for switching from the preceding_optimum secondary multimedia sub-stream to the subsequent_optimum secondary multimedia sub-stream. The direction for switching can include an up-down direction if the subsequent_optimum secondary multimedia sub-stream includes a lower bit rate as compared with the preceding_optimum bit rate. The direction can also include a down-up direction if the subsequent_optimum secondary multimedia sub-stream includes a higher bit rate as compared with the preceding_optimum bit rate. The switch having the up-down direction comprises an up-down switch, wherein the switch having the down-up direction comprises a down-up switch. In one embodiment, a decision of whether to make or to delay making a current switch is based on the direction for the current switch indicated by the detection device, on the prior switching history including at least one prior up-down or at least one prior down-up switch; and on the set of timing data for each prior up-down or each prior down-up switch.

In one embodiment, the synchronous smart terminal sub-stream switch further comprises a synchronous smart terminal sub-stream device for substantially synchronizing the timing of a transition between a preceding_optimum secondary multimedia sub-stream and a subsequent_optimum secondary multimedia sub-stream to the timing of a set of synchronizing data provided by the look-up table in order to substantially minimize the loss of data during the transition.

In one embodiment, the timing of a transition between a preceding_optimum secondary multimedia sub-stream and a subsequent_optimum secondary multimedia sub-stream is synchronized to the timing of a set of synchronizing data transmitted by the secondary multimedia stream in order to substantially minimize the loss of data during the transition. In another embodiment, the set of synchronizing data further includes a plurality of flags indicating at least one optimum time moment when the switch from the preceding_optimum secondary multimedia sub-stream to a subsequent_optimum secondary multimedia sub-stream should take place.

In one embodiment, the synchronous smart terminal sub-stream switch further comprises a receiving multimedia synchronous smart terminal sub-stream switch further including only a receiving device configured to receive the plurality N of multimedia contents from the content switch over the network. In alternative embodiment, the synchronous smart terminal sub-stream switch further includes a transceiver multimedia smart terminal further including a transceiver device configured to receive the plurality N of multimedia contents from the content switch over the network; and configured to transmit to the content switch the condition of reception of each received multimedia content.

Another aspect of the present invention is directed to a video multicasting system for reception of video information. In one embodiment, the system comprises: a content switch coupled to a video content source; and at least one video smart terminal. The video content source includes a plurality of video contents, and each video content is supported by a primary video stream transmitted over a primary dedicated channel having a primary bandwidth. Each video smart terminal is configured to receive from the content switch over a network each video content as a secondary video stream transmitted over a secondary channel having a secondary bandwidth.

In one embodiment, the video content switch further includes a bandwidth scaler configured to scale each primary video stream to a plurality of substantially synchronized secondary video sub-streams.

In one embodiment, the video smart terminal sub-stream switch is configured to switch among the plurality of secondary video sub-streams in order to select a substantially optimum secondary video sub-stream having a substantially optimum low bit rate; wherein the substantially optimum secondary video sub-stream includes a substantially optimum relationship between an error rate level determined at the time of reception of the substantially optimum secondary video sub-stream and the quality of reception of a video content transmitted by the substantially optimum secondary video sub-stream.

In one embodiment, the video smart terminal sub-stream switch further comprises a synchronous video smart terminal sub-stream switch configured to switch among the plurality of secondary video sub-streams in order to select a substantially optimum secondary video sub-stream having a substantially optimum low bit rate. The synchronous video smart terminal sub-stream switch is further configured to substantially synchronize the timing of a transition between a preceding_optimum secondary video sub-stream and a subsequent_optimum secondary video sub-stream to the timing of a set of synchronizing data transmitted by the secondary video stream in order to substantially minimize the loss of data during the transition.

In the preferred embodiment of the present invention, the primary video stream comprises a compressed video stream further comprising a plurality of independent frames and a plurality of dependent frames. The plurality of independent frames further comprises a plurality of snapshots. The plurality of dependent frames further comprises a plurality of motion vectors. A video picture comprises a set of calculated dependent frames. Each calculated dependent frame is calculated by using a set of motion vectors in the dependent frame and a prior independent frame. Each secondary sub-stream further comprises a plurality of independent frames and a plurality of dependent frames. The plurality of independent frames in each sub-stream comprises a plurality of synchronizing data. In this embodiment, the synchronous smart terminal video sub-stream switch further includes a video device for substantially synchronizing the timing of the transition between a preceding_optimum secondary video sub-stream and a subsequent_optimum video sub-stream to the timing of appearance of a plurality of independent frames in the subsequent_optimum secondary video sub-stream in order to substantially minimize the loss of data during the transition.

Yet, one more aspect of the present invention is directed to a method for multicasting reception of multimedia information. In one embodiment, the method comprises the following steps: (1) receiving a plurality N of multimedia contents provided by a multimedia content source by using a content switch coupled to the multimedia content source, wherein each multimedia content is received as a primary multimedia stream transmitted at a primary bit rate over a primary dedicated channel having a primary bandwidth; N is an integer; (2) transmitting over a network each multimedia content by using the content switch; wherein each multimedia content is transmitted as a multimedia stream over a secondary channel having a secondary bandwidth; and (3) receiving over the network each multimedia content as a multimedia stream transmitted over a secondary channel having a secondary bandwidth by at least one multimedia smart terminal.

In the preferred embodiment of the present invention, wherein the content switch further includes a bandwidth scaler; the method of the present invention further includes the step of: (4) scaling each primary multimedia stream transmitted at one primary high bit rate over the primary dedicated channel having one primary bandwidth to a plurality of secondary multimedia sub-streams.

In one embodiment, the step (3) of receiving over the network each multimedia content as a multimedia stream by at least one multimedia smart terminal further includes the following sub-steps: (3A) switching among the plurality of secondary multimedia sub-streams in order to select a substantially optimum secondary multimedia sub-stream having a substantially optimum low bit rate; and (3B) substantially synchronizing the timing of the step (3A) to the timing of a set of synchronizing data.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
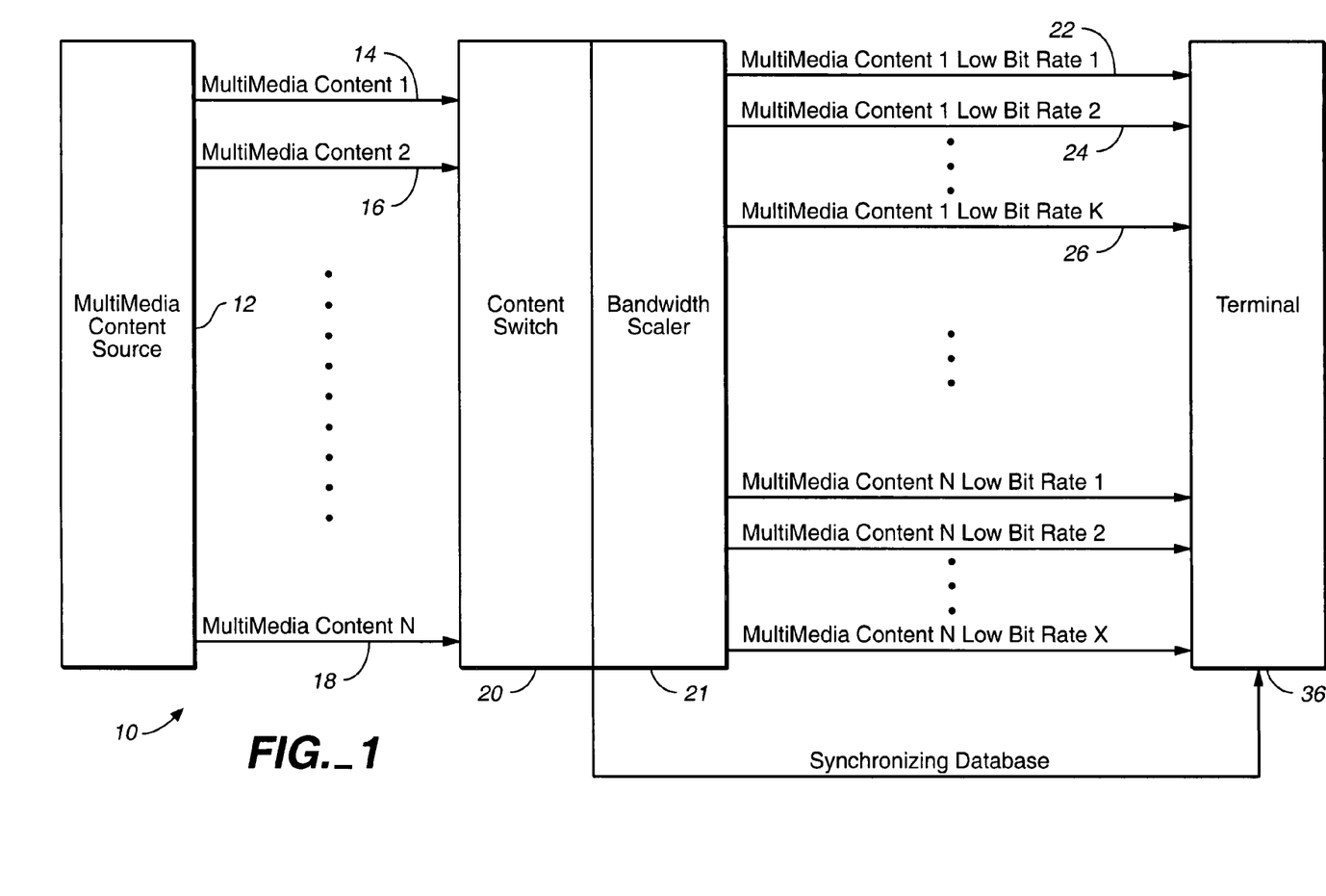
FIG. 1 depicts a multicasting system for transmission and reception of multimedia information that represents the subject-matter of the present invention.

FIG. 1 depicts a multicasting system 10 for reception of multimedia information that represents the subject-matter of the present invention. In the preferred embodiment, the system 10 includes a content switch 20 coupled to a multimedia content source 12. The multimedia content source 12 includes a plurality N of multimedia contents 14, 16, ..., 18, N is an integer. For example, the content source 12 includes a video server that has a number of channels including, but not limited to, CNN, BBC, ABC, and so on. The Real Player that became a standard feature in the Internet related applications can comprise such a server for wired applications of the present invention. For wireless applications of the present invention, the Satellite TV server can be used as a multimedia content source 12 of FIG. 1.

In the wireless embodiment of the present invention, each multimedia content 14, 16, ..., 18 is supported by a compressed primary primary_bit_rate multimedia stream transmitted over a primary dedicated channel having a primary bandwidth. In one embodiment, each multimedia content 14, 16, ..., 18 comprises a compressed video stream transmitted over a primary dedicated channel having a primary bandwidth. The video compression technique utilized in the present application complies with the International Organization for Standardization (ISO)/International Electrotechnical Commission (IEC) Motion Picture Expert Group (MPEG) specifications.

The video compression may be provided in video processing systems to reduce the time of video transmission in communication links, or to transmit broad-bandwidth signals via narrow-bandwidth communication channels. Also, video compression may be used to increase the quantity of video data that can be stored in a given space, or to decrease the space needed to store a given quantity of video data.

The MPEG standards define compression and decompression algorithms for motion-picture video services. One example of such a service is Video-on-Demand system (VOD) system wherein a subscriber interacts with a remote video storage to request the presentation of a particular movie or video program on the subscriber's TV set. Due to video compression, motion-picture images can be sent over a communication channel using only a fraction of conventional television channel. As a result, many more video channels can be carried over a given communication medium, such as television cable media. Moreover, conventional telephone links are enabled to deliver broad-bandwidth television signals.

In the MPEG algorithm, each frame of a motion-picture video is defined either independently, or as a change from a previously and/or future displayed frame. A video scene may be described by a single independent frame (I-frames are intra frames that produce I-pictures), which shows the entire scene as it initially appears, followed by a long series of change frames like P-frames (that are "predicted" frames that produce P-pictures) or and/or B-frames (that are "interpolated" frames that give B-pictures) that describe the changes in the scene. Thus, the MPEG video compression technique eliminates the redundant transmission of unchanging elements of the scene.

Figure 2:
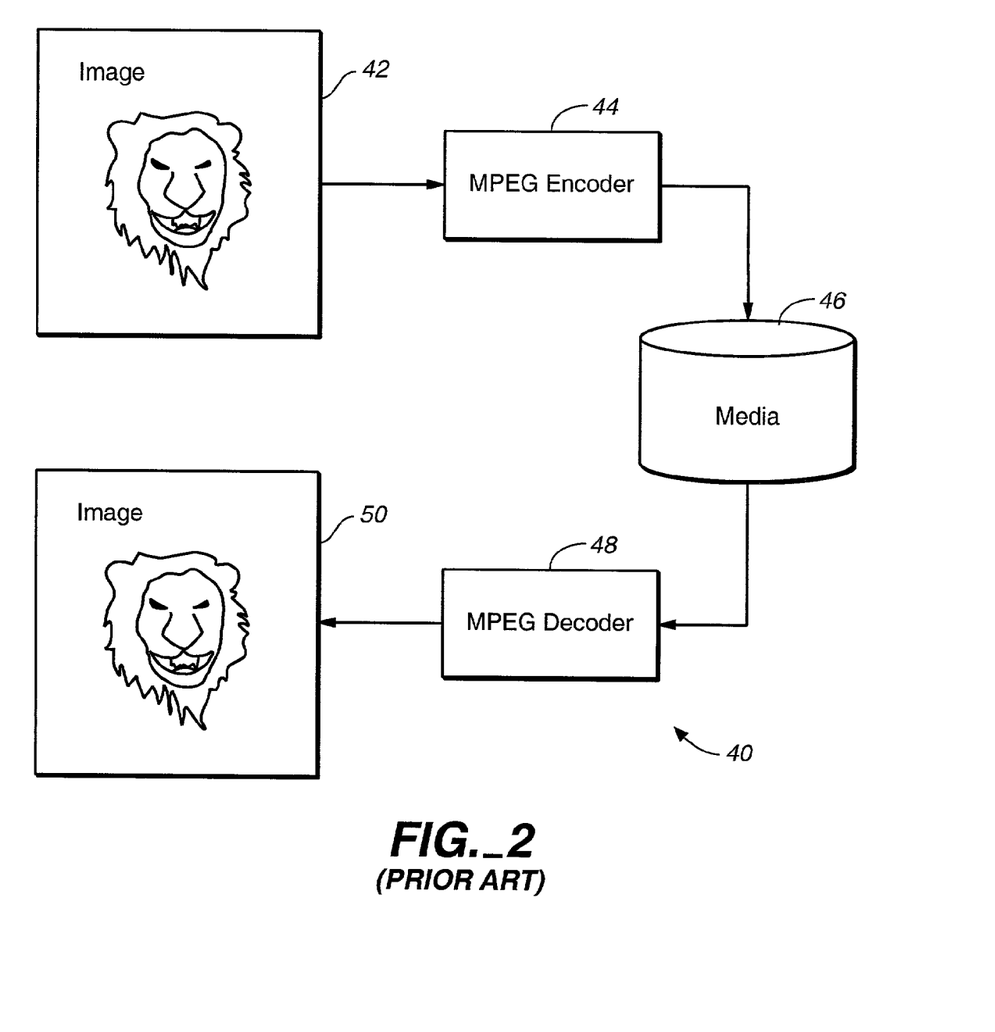
FIG. 2 shows a prior art compression/decompression system.

As shown in FIG. 2, a MPEG video compression/decompression system 40 comprises an image source 42, for example a video camera, or a video service storage for storing a motion-picture video. An MPEG encoder 44 compresses image data from the image source 42 in accordance with the MPEG compression algorithm. The set of compressed image data is supplied to video service media 46, for example, to a TV cable or a telephone system for transmitting to a remote user. Alternatively, the compressed image data may be loaded into a local video storage for further retrieval by a local or remote user. An MPEG decoder 48 decompresses the compressed image data in accordance with the MPEG decompression algorithm, and supplies them to a video terminal 50 that displays the received image.

The MPEG algorithm is defined in the following specifications: ISO/IEC 11172, November 1991 (MPEG 1), and ISO/IEC 13818, March 1995 (MPEG 2). As for MPEG-1, it handles a complete image to be displayed defined as a frame. The size of the frame is set equal to 22 macroblocks horizontally by 16 macroblocks vertically, where 1 macroblock composed of 6 blocks of image, among which 4 blocks represent luminance and 2 blocks represent chrominance. Each block of image contains 8×8 picture elements (pixels).

Motion pictures are provided at thirty frames per second to create the illusion of continuous motion. Since each picture is made up of thousands of pixels, the amount of storage necessary for storing even a short motion sequence is enormous. As higher definition is desired, the number of pixels in each picture is expected to grow also. Fortunately, taking advantage of special properties of the human visual system, lossy compression techniques have been developed to achieve very high data compression without loss of perceived picture quality. (A lossy compression technique involves discarding information not essential to achieve the target picture quality). Nevertheless, the decompression processor is required to reconstruct in real time every pixel of the stored motion sequence.

The "MPEG standard" achieves compatibility between compression and decompression equipment. This standard specifies both the coded digital representation of video signal for the storage media, and the method for decoding. The representation supports normal speed playback, as well as other play modes of color motion pictures, and reproduction of still pictures. The standard covers the common 525- and 625-line television, personal computer and workstation display formats. The MPEG standard is intended for equipment supporting continuous transfer rate of up to 1.5 Mbits per second, such as compact disks, digital audio tapes, or magnetic hard disks. The MPEG standard is intended to support picture frames of approximately 288×352 pixels each at a rate between 24 Hz and 30 Hz.

Under the MPEG standard, the picture frame is divided into a series of "Macroblock slices" (MBS), each MBS containing a number of picture areas (called "macroblocks") each covering an area of 16×16 pixels. Each of these picture areas is represented by one or more 8×8 matrices which elements are the spatial luminance and chrominance values. In one representation (4:2:2 of the macroblock, a luminance value (Y type) is provided for every pixel in the 16×16 pixels picture area (in four 8×8 "Y" matrices), and chrominance values of the U and V (i.e., blue and red chrominance) types, each covering the same 16×16 picture area, are respectively provided in two 8×8 "U" and two 8×8"V" matrices. That is, each 8×8 U or V matrix covers an area of 8×16 pixels. In another representation (4:2:0), a luminance value is provided for every pixel in the 16×16 pixels picture area, and one 8×8 matrix for each of the U and V types is provided to represent the chrominance values of the 16×16 pixels picture area. A group of four contiguous pixels in a 2×2 configuration is called a "quad pixel"; hence, the macroblock can also be thought of as comprising 64 quad pixels in an 8×8 configuration.

Thus, as was explained above, in the prior art, in order to reduce video stream bit-rate, one can use the straightforward method of decompression and compression of the source stream. However, expansive computing power is needed to perform this operation in order to maintain high quality video of the targeted video stream.

As was stated above, the present application claims the priority under the provisional Patent Application No. 60/214,550, filed on Jun. 27, 2000, and entitled: "Methods for bandwidth scaling of a compressed video stream".

The provisional Patent Application No. 60/214,550 discloses new methods for bandwidth scaling of compressed video streams using the bandwidth scaler 21 that is the basis of the present invention. The new method of bandwidth scaling of compressed video streams according to the provisional Patent Application No. 60/214,550, uses motion vectors for pointing small differences between frames including but not limited to MPEG-1, MPEG-2, MPEG-4, MPEG-7, H-261, H-263 standards.

The new method of bandwidth scaling of compressed video streams according to the provisional Patent Application No. 60/214,550 does not use the common method of decompression and compression of the source stream. Instead, the new method of bandwidth scaling of compressed video streams according to the provisional Patent Application No. 60/214,550 utilizes the original motion vectors of the source stream. This method reduces significantly the amount of computer power needed to perform the bandwidth scaling operation. The bandwidth scaling can be performed by using a specific purpose computer chip, or by using a general purpose specially programmed computer.

Referring still to FIG. 1, the content switch 20 further includes a bandwidth scaler 21 configured to scale each primary primary_bit_rate multimedia stream (not shown) transmitted at a primary high bit rate over the primary dedicated channel (not shown) having one primary bandwidth to a plurality K of secondary_bit_rate secondary multimedia sub-streams 22, 24, ..., 26, K is an integer. The first secondary_bit_rate secondary multimedia sub-stream 22 has a first low bit rate, the second secondary_bit_rate secondary multimedia sub-stream 24 has a second low bit rate, and the K-th secondary_bit_rate secondary multimedia sub-stream 26 has the K-th low bit rate.

In one embodiment, the plurality K of secondary_bit_rate secondary multimedia sub-streams 22, 24, ..., 26, for each primary stream (not shown) are substantially synchronized.

Referring still to FIG. 1, the system 10 for multicasting transmission of the multimedia information further includes at least one multimedia smart terminal 36 configured to receive from the content switch 20 over a network (not shown) each multimedia content 14, 16, ..., 18 as the plurality K of secondary_bit_rate secondary multimedia sub-streams 22, 24, ..., 26 transmitted over a secondary channel (not shown), wherein each sub-stream occupies its own bandwidth based on its bit-rate.

Figure 3:
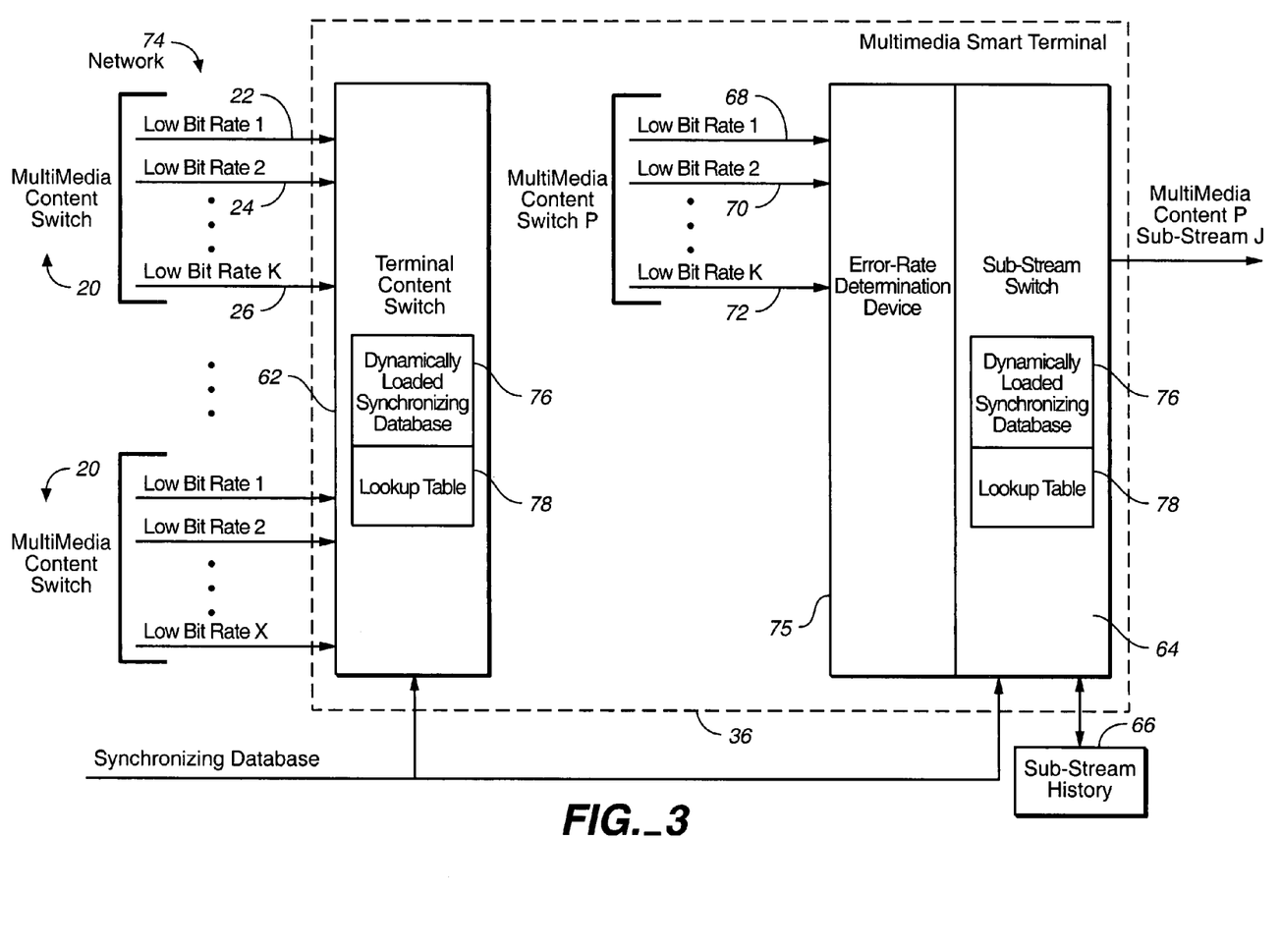
FIG. 3 illustrates a multimedia smart terminal including a content switch configured to select a multimedia content between the plurality N of provided contents, and a smart terminal sub-stream switch configured to select an optimum sub-stream for selected content.

In the preferred embodiment, as depicted in FIG. 3, the multimedia smart terminal 36 further includes a content switch 62 that is configured to select a multimedia content among the plurality N of provided contents. The number N of provided contents depends on the type of the content and the nature of network 74. The network 74 that the multimedia smart terminal 36 utilizes to receive multimedia information from the content switch 20 can include a wireless network that supports the particular multimedia information. For instance, for video information, the network 74 comprises a wireless video network for which the number of channels is in the range of (5–50). Thus, the maximum amount of allowable channels that a particular user can receive is 50 depending on the user's location within a wireless cell during the time of the reception. If the multimedia information comprises only audio data, the number of channels is in the range of (20–200). For a set of sensitive data, the number of channels is in the range of (2–20).

As was explained above, each selected by the smart terminal 36 content is supported by the plurality K of secondary_bit_rate secondary multimedia sub-streams 68, 70, ..., 72. The smart terminal 36 further includes a smart terminal sub-stream switch 64 that is configured to switch among the plurality K of secondary multimedia sub-streams 68, 70, ..., 72. However, before making a decision to select an optimum sub-stream among the plurality of sub-streams that has a substantially optimum relationship between an error rate level determined at the time of reception and the bit-rate, or quality of reception of a multimedia content, the smart terminal sub-stream switch has to continuously check the error rate of each received sub-stream by using an error-rate determination device 75. The smart terminal content switch 62, the sub-stream switch 64, and the error-rate determination device 75 can be implemented by using a specific purpose computer or chip, or a specially programmed general purpose computer.

After the error rate is continuously checked, the sub-stream switch makes a decision of which sub-stream (called an optimum one) having a highest bit-rate can support the multimedia information having an acceptable error rate, and switches the smart terminal to that particular optimum sub-stream.

Repeating again, the bandwidth scaling of compressed video streams using the bandwidth scaler 21 allows one to obtain a plurality of sub-streams for each received multimedia stream. For differently located receiving smart terminals 36 an optimum sub-stream for receiving the same multimedia content can be different depending on the local level of error rate at which the same selected content is received at different locations. The following discussion is focused on a single smart particular terminal that makes a decision of whether to switch from an optimum preceding sub-stream to a subsequent optimum sub-stream, wherein the preceding sub-stream is an optimum sub-stream before the transition, and the subsequent sub-stream is an optimum sub-stream after the transition.

A receiving smart terminal 36 can select an optimum sub-stream having the highest bit-rate for each content provided by the multimedia content source 12 based on the acceptable error rate that can be tolerated without undue deterioration of the reception quality. If the sub-stream with the highest possible bit-rate that supports the selected content starts to have an unacceptable reception quality because of the increased error-rate, the smart terminal 36, as fully explained below, can switch, or jump to another sub-stream with a lower bit rate but with an acceptable level of error rate.

In the prior art system for multimedia unicast over wireless networks, the data receiving capability of wireless devices is dynamically changed, pending their physical status (e.g. in case of entering a shielded area and/or changing status from static to dynamic (movement) and/or changing speed—the receiving capability wireless device is reduced). The prior art bandwidth scaler receives a high bit-rate primary multimedia stream and scales it to a secondary multimedia stream having a lower bit-rate than the primary stream. The scaled secondary multimedia stream is transmitted back to the receiver. The receiver decodes the received multimedia stream, checks the error rate, and according to the error rate level, continuously sends feedback signals via a command loop to the prior art bandwidth scaler in order to increase or to decrease the multimedia stream bit-rate.

On the other hand, the present invention employs the new methods for bandwidth scaling of compressed multimedia streams for the purposes of multicasting transmission of the multimedia information. In the preferred embodiment, the data receiving capability of a wireless smart terminal device 36 is also dynamically changing depending on the condition of the reception. For instance, if the mobile smart terminal enters a shielded area, it changes its mobile status from static to dynamic (movement), and/or it also changes its speed. During all these events the receiving capability of the wireless smart terminal device 36 is reduced.

In the present invention, the bandwidth scaler (21 of FIG. 1) also receives a high bit-rate primary multimedia stream. The primary multimedia stream is scaled to lower bit-rate streams at multiple bit-rates, announced over known protocol such as SDP. The multiple secondary sub-streams are preferably synchronized and identical in their structure. The smart terminal 36 is capable of switching between these sub-streams according to the error rate level. The switch is preferably performed, as explained below, at the nearest I frame type in order to avoid video distortions. Thus, in the present invention, there is no feedback to the content switch 20 from a receiving smart terminal 36.

In one embodiment of the present invention, the timing of a transition between a preceding_optimum secondary_bit_rate secondary multimedia sub-stream and a subsequent_optimum secondary_bit_rate secondary multimedia sub-stream is not synchronized.

In the preferred embodiment of the present invention, the smart terminal sub-stream switch 64 of FIG. 3 further comprises a synchronous smart terminal sub-stream switch configured to substantially synchronize the timing of a transition between a preceding_optimum secondary_bit_rate secondary multimedia sub-stream and a subsequent_optimum secondary_bit_rate secondary multimedia sub-stream to the timing of a set of synchronizing data transmitted by the secondary multimedia stream in order to substantially minimize the loss of data during the transition.

In one embodiment, the synchronous smart terminal sub-stream switch 64 further comprises a dynamically loaded database 76 including a look-up table 78 that is used for synchronizing the timing of the transition between the preceding_optimum secondary_bit_rate secondary multimedia sub-stream and the subsequent_optimum secondary_bit_rate secondary multimedia sub-stream.

Figure 4:
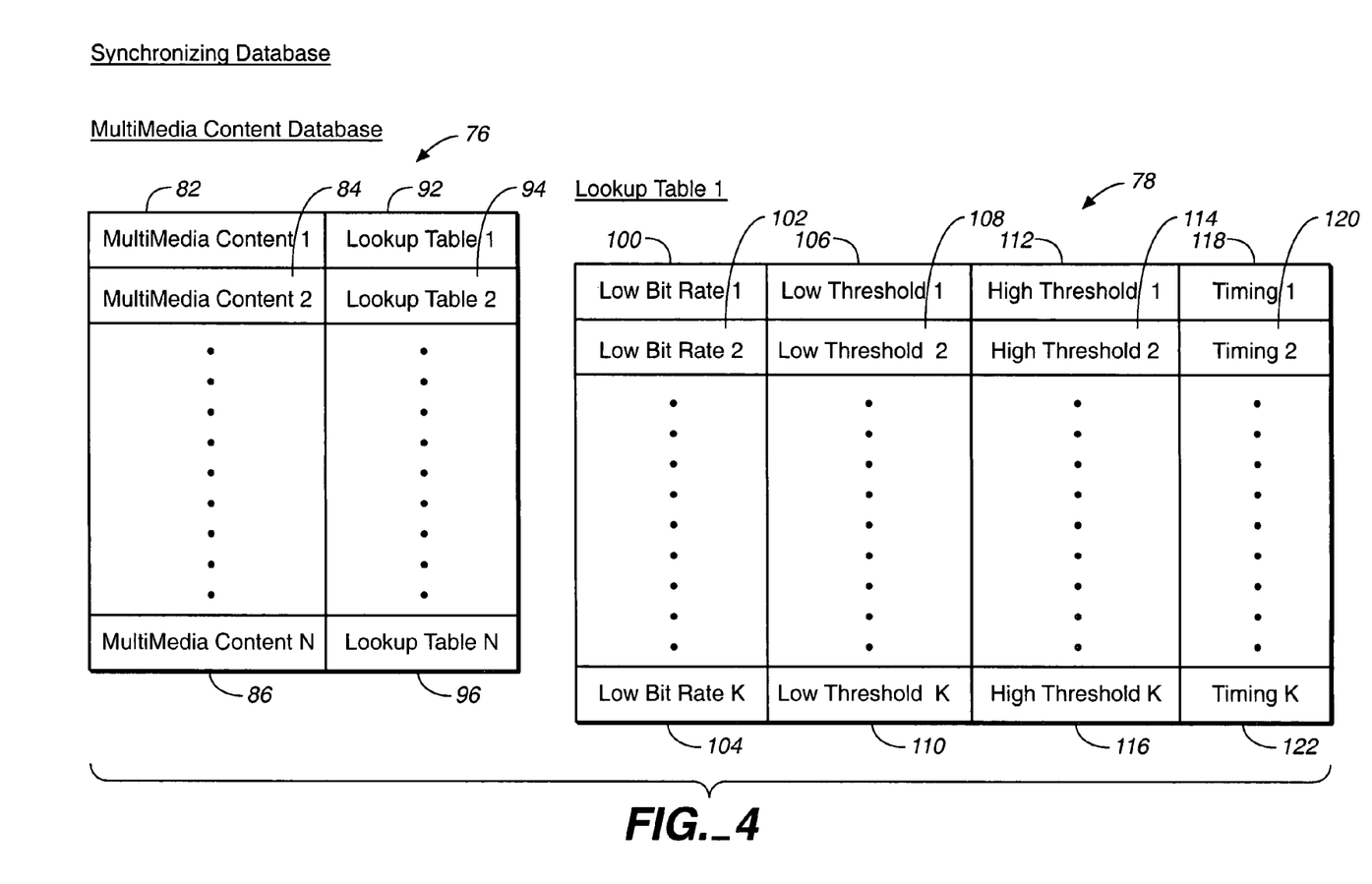
FIG. 4 depicts the synchronizing database comprising N multimedia content entries, and N corresponding look-up table entries.

In one embodiment, FIG. 4 illustrates the synchronizing database 76 comprising N multimedia content entries 82, 84, ... 86; and N corresponding look-up table entries 92, 94, ... 96.

Look-up table #1 78, as shown in FIG. 4, further includes a number of additional entries: a k number of secondary_bit_rate secondary multimedia sub-streams 100, 102, ... 104. For each secondary_bit_rate secondary multimedia sub-streams, the look-up table also includes a lower_error- _rate threshold 106, 108, . . . , 110; a higher_error_rate threshold 112, 114, . . . , 116, and a set of synchronizing data 118, 120, . . . , 122.

In one embodiment, synchronous smart terminal sub-stream switch 64 further comprises a synchronous smart terminal sub-stream means for substantially synchronizing the timing of a transition between a preceding and subsequent optimum secondary multimedia sub-streams to the timing of a set of synchronizing data 118, 120, . . . , 122.

Figure 5:
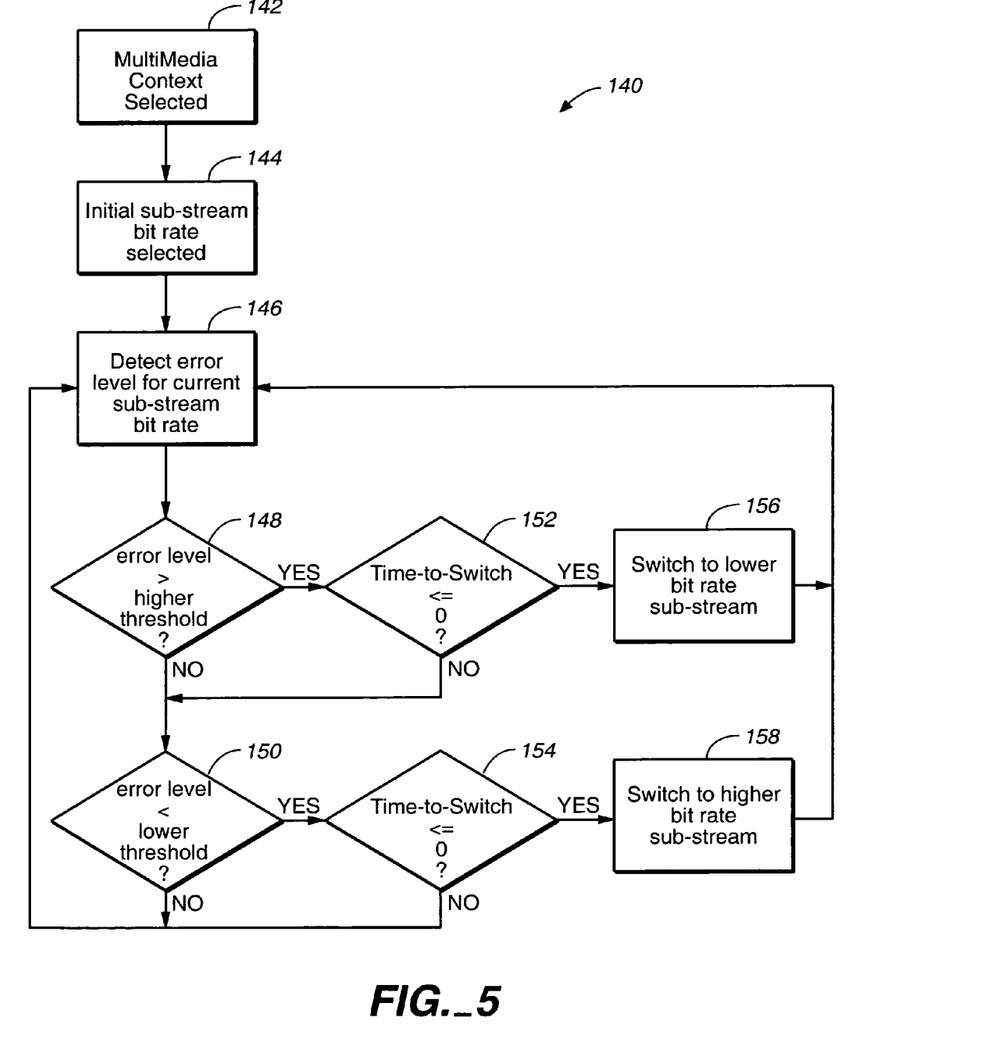
FIG. 5 illustrates the flow chart describing the switch logic flow which corresponds to a method of multicasting reception of multimedia information of the present invention.

In one embodiment, FIG. 5 illustrates the flow chart describing the switch logic flow 140, which also corresponds to a method of multicasting reception of multimedia information of the present invention. After a plurality N of multimedia contents provided by a multimedia content source (step 142) is received by using the smart terminal content switch 62, the smart terminal sub-stream switch 64 selects initially (step 144) a sub-stream with an optimum bit rate by switching among the plurality K of secondary multimedia sub-streams.

In the next step (step 146), a current error rate for a currently employed optimum secondary multimedia sub-stream including a substantially optimum bit rate is continuously determined. If the selected secondary multimedia sub-stream has a determined error rate higher than a predetermined higher_error_rate threshold (the logical condition 148 is logical Yes), and if the timing to switch is synchronized (the timing condition 152 is logical Yes), the switching to the lower bit rate sub-stream takes place (step 156). If, on the other hand, the selected secondary multimedia sub-stream has a determined error rate lower than a predetermined higher_error_rate threshold (the logical condition 148 is logical No), or if the timing to switch is not synchronized (the timing condition 152 is logical No), the switching to the lower bit rate sub-stream does not take place.

Instead, the next logical condition is checked. If the selected multimedia sub-stream has a determined error rate lower than a predetermined lower_error_rate threshold (the logical condition 150 is Yes), and if the timing to switch is synchronized (timing condition 154 is logical Yes), the switching to the higher bit rate sub-stream takes place (step 158). If, on the other hand, the selected secondary multimedia sub-stream has a determined error rate higher than a predetermined lower_error_rate threshold, (the logical condition 150 is logical No), or if the timing to switch is not synchronized (timing condition 154 is logical No), the switching to the higher bit rate sub-stream does not take place.

In one embodiment, the set of synchronizing data further includes a plurality of flags indicating at least one optimum time moment when the switch from the preceding_optimum secondary multimedia sub-stream to a subsequent_optimum secondary multimedia sub-stream takes place. In one embodiment, at least one flag comprises an exact time when the I-frame is to appear in the selected sub-stream.

In one embodiment, the sub-stream switch 64 further includes a sub-stream switch history block 66. The sub-stream switch history block 66 includes a decision making logic for making a decision of whether to make or to delay making a current switch based on several factors. One factor is the direction for switching from the preceding_optimum secondary multimedia sub-stream to the subsequent_optimum secondary multimedia sub-stream. The direction for switching includes an up-down direction or a down-up direction. The direction is an up-down direction if the subsequent_optimum secondary multimedia sub-stream includes a lower bit rate as compared with the preceding_optimum bit rate. If this is the case, the switch having the up-down direction comprises an up-down switch. The direction for switching includes a down-up direction if the subsequent_optimum secondary multimedia sub-stream includes a higher bit rate as compared with the preceding_optimum bit rate. If this is the case, the switch having the down-up direction comprises a down-up switch. Another factor a set of timing data for each prior up-down or down-up switch.

In one embodiment, the sub-stream switch history block 66 can delay making a current switch if the current switch would undermine the quality of reception of multimedia information, for instance, there are too many switches made in the same direction in the very small period of time compared with the time of viewing the multimedia content. In another embodiment, the sub-stream switch history block 66 can delay making a current switch if the number of prior switches over the predetermined time period exceeds a predetermined threshold.

EXAMPLE I

The formula for sub-stream switch:

Time to switch: remaining time for current switch (real number)

Time to switch=not($d1$(exclusive or)$dd$)*($t$min−($tt-t1$));

if Time to switch<=0 switch action can be performed;
wherein: ti—time of last switch–(real number);
tmin—Minimum time for re-switching–(real number);
tt—current time–(real number);
   d1—direction of last switch: (0)—to a lower baud_rate (−1)—to higher baud_rate (Boolean number);
   dd—requested direction of current switch: (0)—to a lower baud_rate (−1)—to higher baud_rate (Boolean number).

In the preferred embodiment, the present invention includes a wireless video multicasting system for reception a video information. The system 10 of FIG. 1 can be used to illustrate this embodiment, wherein the multimedia content source 12 comprises a video content source, the content switch 20 comprises video content switch, and a multimedia smart terminal 36 comprises a wireless video smart terminal. In this embodiment, the video content switch 20 further includes a video bandwidth scaler 21 configured to scale each primary video stream transmitted at a primary high bit rate over one the primary dedicated channel having one the primary bandwidth to a plurality K of secondary_bit_rate secondary video sub-streams, wherein K is an integer. In one embodiment, the plurality K of secondary_bit_rate secondary video sub-streams is not synchronized. In the preferred embodiment, the plurality K of secondary_bit_rate secondary video sub-streams is substantially synchronized.

In one embodiment, the video smart terminal 36 includes a video smart terminal sub-stream switch 64 configured to switch among the plurality K of secondary video sub-streams in order to select a substantially optimum secondary video sub-stream having a substantially optimum low bit rate. The substantially optimum secondary video sub-stream includes the highest possible bit rate at which the selected video content can be received at the acceptable error rate.

In the preferred embodiment, the video smart terminal sub-stream switch 64 further comprises a synchronous video smart terminal sub-stream switch configured to substantially synchronize the timing of a transition between a preceding_optimum secondary video sub-stream and a subsequent_ optimum secondary video sub-stream to the timing of a set of synchronizing data transmitted by the secondary_bit_rate secondary video stream in order to substantially minimize the loss of data during the transition.

In one embodiment, the synchronous video smart terminal sub-stream switch 64 further comprises a dynamically loaded database 76 including a look-up table 78 comprising the N video content entries including an entry for a number of secondary video sub-streams 100, 102, . . . , 104, including an entry for a number of lower_error_rate thresholds 106, 108, . . . 110, including an entry for a number of higher_error_rate thresholds 112, 114, . . . , 116, and including an entry for a number of sets of synchronizing data 118, 120, . . . , 122.

In the preferred embodiment of the present invention, the primary video stream comprises a compressed video stream further comprising a plurality of I-independent frames and a plurality of dependent frames. The plurality of independent frames comprises a plurality of snapshots. The plurality of dependent frames comprises a plurality of motion vectors.

In one embodiment, each video picture comprises a set of dependent frames calculated by using a set of motion vectors in the dependent frame and a prior independent frame. In this embodiment, each secondary sub-stream further comprises a plurality of independent frames and a plurality of dependent frames, and the plurality of independent frames in each sub-stream can be used as the plurality of synchronizing data. In this embodiment, the synchronous smart terminal sub-stream further includes a video device for substantially synchronizing the timing of the transition between a preceding_optimum secondary video sub-stream and a subsequent_optimum secondary video sub-stream to the timing of appearance of a plurality of independent frames in the subsequent_optimum secondary video sub-stream in order to substantially minimize the loss of data during the transition.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multicasting system for reception of multimedia information, said system comprising:
 a content switch coupled to a multimedia content source; said multimedia content source including a plurality N of multimedia contents, each said multimedia content being supported by a primary primary bit rate multimedia stream transmitted over a primary dedicated channel having a primary bandwidth; N being an integer; said content switch further including:
  a bandwidth scaler configured to scale each said primary primary bit rate multimedia stream transmitted at a primary high bit rate over one said primary dedicated channel having one said primary bandwidth to a plurality K of secondary bit rate secondary multimedia sub-streams, K being an integer, wherein a first secondary bit rate secondary multimedia sub-stream has a first low bit rate, wherein a second secondary bit rate secondary multimedia sub-stream has a second low bit rate, and wherein a K-th secondary bit rate secondary multimedia sub-stream has a K-th low bit rate, and
 at least one multimedia smart terminal, each said multimedia smart terminal configured to receive from said content switch over a network each said multimedia content as a secondary multimedia stream transmitted over a secondary channel having a secondary bandwidth; wherein at least one said multimedia smart terminal further includes:
  a smart terminal sub-stream switch configured to switch between said plurality K of secondary_bit_rate secondary multimedia sub-streams in order to select a substantially optimum secondary_bit_rate secondary multimedia sub-stream having a substantially optimum low bit rate;
 wherein said substantially optimum secondary_bit_rate secondary multimedia sub-stream includes a substantially optimum relationship between an error rate level determined at the time of reception of said substantially optimum secondary_bit_rate secondary multimedia sub-stream and the quality of reception of a multimedia content supported by said substantially optimum secondary_bit_rate secondary multimedia sub-stream.

2. The system of claim 1, wherein said plurality K of secondary_bit_rate secondary video sub-streams is substantially synchronized, and wherein said smart terminal sub-stream switch further comprises:
 a synchronous smart terminal sub-stream switch;
 wherein said synchronous smart terminal sub-stream switch is configured to switch between said plurality K of secondary_bit_rate secondary multimedia sub-streams in order to select a substantially optimum secondary_bit_rate secondary multimedia sub-stream having a substantially optimum low bit rate;
 and wherein said synchronous smart terminal sub-stream switch is configured to substantially synchronize the timing of a transition between a preceding_optimum secondary_bit_rate secondary multimedia sub-stream and a subsequent_optimum secondary_bit_rate secondary multimedia sub-stream to the timing of a set of synchronizing data transmitted by said secondary multimedia stream in order to substantially minimize the loss of data during said transition.

3. The system of claim 2, wherein said synchronous smart terminal sub-stream switch further comprises:
 a dynamically loaded database including a look-up table comprising said N multimedia content entries; wherein for each said content entry n, n being an integer less or equal to N, said look-up table further includes a k number of secondary_bit_rate secondary multimedia sub-streams; k being an integer less or equal to K; and wherein for each said secondary_bit_rate secondary multimedia sub-stream said look-up table further includes a lower_error_rate threshold, a higher_error_rate threshold, and a set of synchronizing data.

4. The system of claim 3, wherein said synchronous smart terminal sub-stream switch further comprises:
 a switching smart terminal sub-stream means for switching among a plurality of k available secondary_bit_rate secondary multimedia sub-streams in order to select for each said multimedia content a substantially optimum secondary_bit_rate secondary multimedia sub-stream based on said look-up table; and
 a synchronous smart terminal sub-stream means for substantially synchronizing the timing of a transition between a preceding_optimum secondary_bit_rate secondary multimedia sub-stream and a subsequent_optimum secondary_bit_rate secondary multimedia sub-stream to the timing of a set of synchronizing data provided by said look-up table in order to substantially minimize the loss of data during said transition.

5. The system of claim 4, wherein said switching smart terminal sub-stream means further includes:
   a means for continuously determining a current error rate for a currently employed optimum secondary_bit_rate secondary multimedia sub-stream including a substantially optimum bit rate;
   a higher_threshold switching means; wherein if said substantially optimum secondary_bit_rate secondary multimedia sub-stream has a determined error rate higher than a predetermined higher_error_rate threshold, said higher_threshold switching means switches said content from said substantially optimum secondary_bit_rate secondary multimedia sub-stream to a lower secondary_bit_rate secondary multimedia sub-stream including a lower_low bit rate, wherein said lower_low bit rate is lower than said substantially optimum low bit rate; and
   a lower_threshold switching means; wherein if said substantially optimum secondary_bit_rate secondary multimedia sub-stream has a determined error rate lower than a predetermined lower_error_rate threshold, said lower_threshold switching means switches said content from said substantially optimum secondary_bit_rate secondary multimedia sub-stream to a higher secondary bit_rate secondary multimedia sub-stream including a higher_low bit rate, wherein said higher_low bit rate is lower than said substantially optimum low bit rate.

6. The system of claim 5, wherein said set of synchronizing data further includes a plurality of flags; said system further including:
   a flag means for continuously determining said plurality of flags indicating at least one optimum time moment when said switch from said preceding_optimum secondary_bit_rate secondary multimedia sub-stream to a subsequent_optimum secondary_bit_rate secondary multimedia sub-stream takes place.

7. The system of claim 4, wherein said switching smart terminal sub-stream means further includes:
   a means for continuously determining an error rate for said preceding_optimum secondary_bit_rate secondary multimedia sub-stream; wherein said determined error rate indicates a direction for switching from said preceding_optimum secondary_bit_rate secondary multimedia sub-stream to said subsequent_optimum secondary_bit_rate secondary multimedia sub-stream; wherein said direction includes an up-down direction if said subsequent_optimum secondary_bit_rate secondary multimedia sub-stream includes a lower bit rate as compared with said preceding_optimum bit rate; said switch having said up-down direction comprises an up-down switch; and wherein said direction includes a down-up direction if said subsequent_optimum secondary_bit_rate secondary multimedia sub-stream includes a higher bit rate as compared with said preceding_optimum bit rate; said switch having said down-up direction comprises a down-up switch;
   a prior history switching means for determining a prior switching history including at least one prior up-down or at least one down-up switch; and for tracking and collecting a set of timing data for each said prior up-down or down-up switch; and
   a decision making means for making a decision of whether to make or to delay making a current switch based on said direction for said current switch indicated by said detection means, based on said prior switching history including at least one said prior up-down or at least one said prior down-up switch; and based on said set of timing data for each said prior up-down or each said prior down-up switch.

8. The system of claim 7, wherein said decision making means further includes:
   a means for calculating a number of prior switches over a predetermined time period; wherein if said number of prior switches over said predetermined time period exceeds a predetermined threshold said decision of whether to make or to delay making a current switch is delayed until said number of prior switches over said predetermined time period goes below said predetermined threshold.

9. The system of claim 3; wherein said synchronous smart terminal sub-stream switch further comprises:
   a receiving multimedia synchronous smart terminal sub-stream switch further including:
      a receiving device configured to receive said plurality N of multimedia contents from said content switch over said network, and configured to receive a look-up table comprising said N multimedia content entries; wherein for each said content entry n, wherein n is an integer less or equal to N, said look-up table further includes a k number of secondary_bit_rate secondary multimedia sub-streams; wherein k is an integer less or equal to K; and wherein for each said secondary_bit_rate secondary multimedia sub-stream said look-up table further includes a lower_error_rate threshold, a higher_error_rate threshold, and a set of synchronizing data; and
      a smart terminal content switch configured to switch between said plurality N of available multimedia contents based on said look-up table.

10. The system of claim 3;
    wherein at least one said multimedia smart terminal further includes:
       a transceiver multimedia smart terminal further including:
          a transceiver device; and
          a smart terminal content switch;
       wherein said receiving/transmitting device is configured to receive said plurality N of multimedia contents from said content switch over said network;
       and wherein said smart terminal content switch is configured to receive a look-up table comprising said N multimedia content entries; wherein for each said content entry n, wherein n is an integer less or equal to N, said look-up table further includes a k number of secondary_bit_rate secondary multimedia sub-streams; wherein k is an integer less or equal to K; and wherein for each said secondary_bit_rate secondary multimedia sub-stream said look-up table further includes a lower_error_rate threshold, a higher_error_rate threshold, and a set of synchronizing data;
       and wherein said receiving/transmitting device is configured to transmit to said content switch the condition of reception of each said received multimedia content.

11. In a multicasting transmission system, wherein a multimedia content source includes a plurality N of multimedia contents, N is an integer, wherein a content switch is coupled to said multimedia content source, and wherein said content switch receives each said multimedia content as a primary multimedia stream transmitted at a primary high bit rate over a primary dedicated channel having a primary bandwidth, wherein said content switch further includes a bandwidth scaler configured to scale each said received primary primary_bit_rate multimedia stream into a plurality K of secondary_bit_rate secondary multimedia sub-streams, K being an integer, wherein a first secondary_bit_rate secondary multimedia sub-stream has a first low bit rate, wherein a second secondary_bit_rate secondary multimedia sub-stream has a second low bit rate, and wherein a K-th secondary_bit_rate secondary multimedia sub-stream has a K-th low bit rate, and wherein each said secondary_bit_rate secondary multimedia sub-stream is substantially synchronized to one said primary primary_bit_rate multimedia stream; a multimedia smart terminal configured to receive from said content switch over a network at least one multimedia content as a multimedia stream transmitted over a secondary channel having a secondary bandwidth, said multimedia smart terminal further comprises:

a smart terminal sub-stream switch configured to switch between said plurality K of secondary_bit_rate secondary multimedia sub-streams in order to select a substantially optimum secondary_bit_rate secondary multimedia sub-stream having a substantially optimum low bit rate; wherein said substantially optimum secondary_bit_rate secondary multimedia sub-stream includes a substantially optimum relationship between an error rate level determined at the time of reception of said substantially optimum secondary_bit_rate secondary multimedia sub-stream and the quality of reception of a multimedia content supported by said substantially optimum secondary_bit_rate secondary multimedia sub-stream.

12. In a multicasting transmission system of claim 11, wherein said smart terminal sub-stream switch further comprises:

a synchronous smart terminal sub-stream switch;

wherein said synchronous smart terminal sub-stream switch is configured to switch between said plurality K of secondary_bit_rate secondary multimedia sub-streams in order to select a substantially optimum secondary_bit_rate secondary multimedia sub-stream having a substantially optimum low bit rate;

and wherein said synchronous smart terminal sub-stream switch is configured to substantially synchronize the timing of a transition between a preceding_optimum secondary_bit_rate secondary multimedia sub-stream and a subsequent_optimum secondary_bit_rate secondary multimedia sub-stream to the timing of a set of synchronizing data transmitted by said secondary multimedia stream in order to substantially minimize the loss of data during said transition.

13. In a multicasting transmission system of claim 12, wherein said synchronous smart terminal sub-stream switch further comprises:

a dynamically loaded database including a look-up table comprising said N multimedia content entries; wherein for each said content entry n, n being an integer less or equal to N, said look-up table further includes a k number of secondary_bit_rate secondary multimedia sub-streams; k being an integer less or equal to K; and wherein for each said secondary_bit_rate secondary multimedia sub-stream said look-up table further includes a lower_error_rate threshold, a higher_error_rate threshold, and a set of synchronizing data.

14. In a multicasting transmission system of claim 13, wherein said synchronous smart terminal sub-stream switch further comprises:

a switching smart terminal sub-stream means for switching among a plurality of k available secondary_bit_rate secondary multimedia sub-streams in order to select for each said multimedia content a substantially optimum secondary_bit_rate secondary multimedia sub-stream based on said look-up table; and a synchronous smart terminal sub-stream means for substantially synchronizing the timing of a transition between a preceding_optimum secondary_bit_rate secondary multimedia sub-stream and a subsequent_optimum secondary_bit_rate secondary multimedia sub-stream to the timing of a set of synchronizing data provided by said look-up table in order to substantially minimize the loss of data during said transition.

15. In a video multicasting transmission system, wherein a video content source includes a plurality N of video contents, N is an integer, wherein a content switch is coupled to said video content source, and wherein said content switch receives each said video content as a primary video stream transmitted at a primary high bit rate over a primary dedicated channel having a primary bandwidth, wherein said content switch further includes a bandwidth scaler configured to scale each said received primary primary_bit_rate video stream into a plurality K of secondary_bit_rate secondary video sub-streams, K being an integer, wherein a first secondary_bit_rate secondary video sub-stream has a first low bit rate, wherein a second secondary_bit_rate secondary video sub-stream has a second low bit rate, and wherein a K-th secondary_bit_rate secondary video sub-stream has a K-th low bit rate, and wherein each said secondary_bit_rate secondary video sub-stream is substantially synchronized to one said primary primary_bit_rate video stream; a video smart terminal configured to receive from said content switch over a network at least one video content as a secondary video stream transmitted over a secondary channel having a secondary bandwidth, said video smart terminal further comprises:

a video smart terminal sub-stream switch configured to switch between said plurality K of secondary_bit_rate secondary video sub-streams in order to select a substantially optimum secondary_bit_rate secondary video sub-stream having a substantially optimum low bit rate; wherein said substantially optimum secondary_bit_rate secondary video sub-stream includes a substantially optimum relationship between an error rate level determined at the time of reception of said substantially optimum secondary_bit_rate secondary video sub-stream and the quality of reception of a video content transmitted by said substantially optimum secondary_bit_rate secondary video sub-stream.

16. In a multicasting transmission system of claim 15, said video smart terminal sub-stream switch further comprising:

a synchronous video smart terminal sub-stream switch;

wherein said synchronous video smart terminal sub-stream switch is configured to switch between said plurality K of secondary_bit_rate secondary video sub-streams in order to select a substantially optimum secondary_bit_rate secondary video sub-stream having a substantially optimum low bit rate;

and wherein said synchronous video smart terminal sub-stream switch is configured to substantially synchronize the timing of a transition between a preceding_optimum secondary_bit_rate secondary video sub-stream and a subsequent_optimum secondary_bit_rate secondary video sub-stream to the timing of a set of synchronizing data transmitted by said secondary_bit_rate secondary video stream in order to substantially minimize the loss of data during said transition.

17. In a multicasting transmission system of claim 16, said synchronous video smart terminal sub-stream switch further comprising:
a dynamically loaded database including a look-up table comprising said N video content entries; wherein for each said content entry n, wherein n is an integer less or equal to N, said look-up table further includes a k number of secondary_bit_rate secondary video sub-streams; wherein k is an integer less or equal to K; and wherein for each said secondary_bit_rate secondary video sub-stream said look-up table further includes a lower_error_rate threshold, a higher_error_rate threshold, and a set of synchronizing data.

18. In a multicasting transmission system of claim 16, said synchronous smart terminal sub-stream switch further comprising:
a switching smart terminal sub-stream means for switching among a plurality of k available secondary_bit_rate secondary video sub-streams in order to select for each said video content a substantially optimum secondary_bit_rate secondary video sub-stream based on said look-up table; and
a synchronous smart terminal sub-stream means for substantially synchronizing the timing of a transition between a preceding_optimum secondary_bit_rate secondary video sub-stream and a subsequent_optimum secondary_bit_rate secondary video sub-stream to the timing of a set of synchronizing data provided by said look-up table in order to substantially minimize the loss of data during said transition.

19. In a multicasting transmission system of claim 16, said primary video stream comprising a compressed video stream further comprising a plurality of independent frames and a plurality of dependent frames; said plurality of independent frames further comprising a plurality of snapshots, said plurality of dependent frames further comprising a plurality of motion vectors; wherein a video picture comprises a set of calculated dependent frames, wherein each said calculated dependent frame is calculated by using a set of motion vectors in said dependent frame and a prior independent frame; wherein each said secondary sub-stream further comprises a plurality of independent frames and a plurality of dependent frames; wherein said plurality of independent frames in each said sub-stream comprises a plurality of synchronizing data; and wherein said synchronous smart terminal sub-stream means further includes:
a video means for substantially synchronizing the timing of said transition between a preceding_optimum secondary_bit_rate secondary video sub-stream and a subsequent_optimum secondary_bit_rate secondary video sub-stream to the timing of appearance of a plurality of independent frames in said subsequent_optimum secondary_bit_rate secondary video sub-stream in order to substantially minimize the loss of data during said transition.

20. In a multicasting transmission system of claim 16, said primary video stream comprising a compressed video&data stream further comprising a plurality of independent frames and a plurality of dependent frames; said plurality of independent frames further comprising a plurality of snapshots, said plurality of dependent frames further comprising a plurality of motion vectors; wherein a video picture comprises a set of calculated dependent frames, wherein each said calculated depended frame is calculated by using a set of motion vectors in said dependent frame and a prior independent frame; wherein each said secondary sub-stream further comprises a plurality of independent frames and a plurality of dependent frames; wherein said plurality of independent frames in each said sub-stream comprises a plurality of synchronizing data; and wherein said synchronous smart terminal sub-stream means further includes:
a video&data means for substantially synchronizing the timing of said transition between a preceding_optimum secondary_bit_rate secondary video sub-stream and a subsequent_optimum secondary_bit_rate secondary video sub-stream to the timing of appearance of a plurality of independent frames in said subsequent_optimum secondary_bit_rate secondary video sub-stream in order to substantially minimize the loss of data during said transition.

21. A method of multicasting reception of multimedia information, said method comprising the steps of:
receiving a plurality N of multimedia contents provided by a multimedia content source by using a content switch coupled to said multimedia content source, wherein each said multimedia content is received as a primary multimedia stream transmitted at a primary bit rate over a primary dedicated channel having a primary bandwidth; N being an integer;
transmitting over a network each said multimedia content by using said content switch; wherein each said multimedia content is transmitted as a multimedia stream over a secondary channel having a secondary bandwidth; wherein said content switch further includes a bandwidth scaler; and wherein said step of transmitting over said network each said multimedia content further includes the step of:
scaling each said primary primary bit rate multimedia stream transmitted at one said primary high bit rate over one said primary dedicated channel having one said primary bandwidth to a plurality K of secondary bit rate secondary multimedia sub-streams, K being an integer, wherein a first secondary bit rate secondary multimedia sub-stream has a first low bit rate, wherein a second secondary bit rate secondary multimedia sub-stream has a second low bit rate, and wherein a K-th secondary bit rate secondary multimedia sub-stream has a K-th low bit rate; and
receiving over said network each said multimedia content as a multimedia stream transmitted over a secondary channel having a secondary bandwidth by at least one multimedia smart terminal;
wherein at least one said multimedia smart terminal further includes a smart terminal sub-stream switch; and wherein said step of receiving over said network each said multimedia content by using said smart terminal sub-stream switch further includes the step of;
switching between said plurality K of secondary_bit_rate secondary multimedia sub-streams in order to select a substantially optimum secondary_bit_rate secondary multimedia sub-stream having a substantially optimum low bit rate; wherein said substantially optimum secondary_bit_rate secondary multimedia sub-stream includes a substantially optimum relationship between an error rate level determined at the time of reception of said substantially optimum secondary_bit_rate secondary multimedia substream and the quality of reception of a multimedia content supported by said substantially optimum secondary_bit_rate secondary multimedia substream.

22. A method of multicasting reception of multimedia information, said method comprising the steps of:
receiving a plurality N of multimedia contents provided by a multimedia content source by using a content switch coupled to said multimedia content source, wherein each said multimedia content is received as a primary multimedia stream transmitted at a primary bit rate over a primary dedicated channel having a primary bandwidth; N being an integer;
transmitting over a network each said multimedia content by using said content switch; wherein each said multimedia content is transmitted as a multimedia stream over a secondary channel having a secondary bandwidth; wherein said content switch further includes a bandwidth scaler; and wherein said step of transmitting over said network each said multimedia content further includes the step of:
scaling each said primary primary bit rate multimedia stream transmitted at one said primary high bit rate over one said primary dedicated channel having one said primary bandwidth to a plurality K of secondary bit rate secondary multimedia sub-streams, K being an integer, wherein a first secondary bit rate secondary multimedia sub-stream has a first low bit rate, wherein a second secondary bit rate secondary multimedia sub-stream has a second low bit rate, and wherein a K-th secondary bit rate secondary multimedia sub-stream has a K-th low bit rate; and
receiving over said network each said multimedia content as a multimedia stream transmitted over a secondary channel having a secondary bandwidth by at least one multimedia smart terminal; wherein at least one said multimedia smart terminal further includes a synchronous smart terminal sub-stream switch; and wherein said step of receiving over said network each said multimedia content further includes the steps of:
(A) switching between said plurality K of secondary_bit_rate secondary multimedia sub-streams in order to select a substantially optimum secondary_bit_rate secondary multimedia sub-stream having a substantially optimum low bit rate; and
(B) substantially synchronizing the timing of said step (A) to the timing of a set of synchronizing data transmitted by said secondary_bit_rate secondary multimedia stream.

23. A method of multicasting reception of multimedia information, said method comprising the steps of:
receiving a plurality N of multimedia contents provided by a multimedia content source by using a content switch coupled to said multimedia content source, wherein each said multimedia content is received as a primary multimedia stream transmitted at a primary bit rate over a primary dedicated channel having a primary bandwidth; N being an integer;
transmitting over a network each said multimedia content by using said content switch; wherein each said multimedia content is transmitted as a multimedia stream over a secondary channel having a secondary bandwidth; wherein said content switch further includes a bandwidth scaler; and wherein said step of transmitting over said network each said multimedia content further includes the step of:
scaling each said primary primary bit rate multimedia stream transmitted at one said primary high bit rate over one said primary dedicated channel having one said primary bandwidth to a plurality K of secondary bit rate secondary multimedia sub-streams, K being an integer, wherein a first secondary bit rate secondary multimedia sub-stream has a first low bit rate, wherein a second secondary bit rate secondary multimedia sub-stream has a second low bit rate, and wherein a K-th secondary bit rate secondary multimedia sub-stream has a K-th low bit rate; and
receiving over said network each said multimedia content as a multimedia stream transmitted over a secondary channel having a secondary bandwidth by at least one multimedia smart terminal;
wherein at least one said multimedia smart terminal further includes a synchronous smart terminal sub-stream switch further comprising a dynamically loaded database including a look-up table comprising said N multimedia content entries; wherein for each said content entry n, wherein n is an integer less or equal to N, said look-up table further includes a k number of secondary_bit_rate secondary multimedia sub-streams; wherein k is an integer less or equal to K; and wherein for each said secondary_bit_rate secondary multimedia sub-stream said look-up table further includes a lower_error_rate threshold, a higher_error_rate threshold, and a set of synchronizing data; and wherein said step of receiving over said network each said multimedia content further includes the steps of:
(A) switching among a plurality of k available secondary_bit_rate secondary multimedia sub-streams in order to select for each said multimedia content a substantially optimum secondary_bit_rate secondary multimedia sub-stream based on said look-up table; and
(B) substantially synchronizing the timing of a transition between a preceding_optimum secondary_bit_rate secondary multimedia sub-stream and a subsequent_optimum secondary_bit_rate secondary multimedia sub-stream to the timing of a set of synchronizing data provided by said look-up table in order to substantially minimize the loss of data during said transition.

24. The method of claim 23, wherein said step (A) further includes the steps of:
(A1) continuously determining a current error rate for a currently employed optimum secondary_bit_rate secondary multimedia sub-stream including a substantially optimum bit rate;
(A2) if said substantially optimum secondary_bit_rate secondary multimedia sub-stream has a determined error rate higher than a predetermined higher_error_rate threshold, switching said content from said substantially optimum secondary_bit_rate secondary multimedia sub-stream to a lower secondary_bit_rate secondary multimedia sub-stream including a lower_low bit rate, wherein said lower_low bit rate is lower than said substantially optimum low bit rate; and
(A3) if said substantially optimum secondary_bit_rate secondary multimedia sub-stream has a determined error rate lower than a predetermined lower_error_rate threshold; switching said content from said substantially optimum secondary_bit_rate secondary multimedia sub-stream to a higher secondary_bit_rate secondary multimedia sub-stream including a higher_low bit rate, wherein said higher_low bit rate is lower than said substantially optimum low bit rate.

25. The method of claim 23, wherein said step (A) further includes the steps of:
(A4) switching said multimedia content from a first optimum secondary_bit_rate secondary multimedia sub-stream including a first optimum low bit rate to a second optimum secondary_bit_rate secondary multimedia sub-stream including a second optimum low bit rate, wherein the relationship between said second optimum low bit rate and said first optimum low bit rate, that is the bit_rate_direction of a current switch of said multimedia content from said first optimum secondary_bit_rate secondary multimedia sub-stream to said second optimum secondary_bit_rate secondary multimedia sub-stream is determined by the bit_rate_direction of a prior switch.

26. In a multicasting transmission system, wherein a multimedia content source includes a plurality N of multimedia contents, N is an integer, wherein a content switch is coupled to said multimedia content source, and wherein said content switch receives each said multimedia content as a primary multimedia stream transmitted at a primary bit rate over a primary dedicated channel having a primary bandwidth; wherein said content switch further includes a bandwidth scaler configured to scale each said primary primary_bit_rate multimedia stream transmitted at one said primary high bit rate over one said primary dedicated channel having one said primary bandwidth into a plurality K of secondary_bit_rate secondary multimedia sub-streams, K being an integer, wherein a first secondary_bit_rate secondary multimedia sub-stream has a first low bit rate, wherein a second secondary_bit_rate secondary multimedia sub-stream has a second low bit rate, and wherein a K-th secondary_bit_rate secondary multimedia sub-stream has a K-th low bit rate, and wherein each said secondary_bit_rate secondary multimedia sub-stream is substantially synchronized to a set of synchronizing data; said multimedia smart terminal further including smart terminal sub-stream switch;
a method of receiving from said content switch over a network at least one multimedia content as a multimedia stream transmitted over a secondary channel having a secondary bandwidth using a receiving multimedia smart terminal further comprising a receiving device and a smart terminal content switch; said method comprising the steps of:
receiving said plurality N of multimedia contents from said content switch over said network using said receiving device;
switching between said plurality N of available multimedia contents using said smart terminal content switch; and
switching between said plurality K of secondary_bit_rate secondary multimedia sub-streams in order to select a substantially optimum secondary_bit_rate secondary multimedia sub-stream having a substantially optimum low bit rate.

27. A multicasting system for wireless reception of multimedia information, said system comprising:
a content switch coupled to a multimedia content source; wherein said multimedia content source includes a plurality N of multimedia contents, N being an integer, and wherein said content switch receives each said multimedia content over a first wireless network as a primary multimedia stream transmitted at a primary bit rate over a primary dedicated channel having a primary bandwidth; and
at least one multimedia smart terminal, each said multimedia smart terminal configured to receive from said content switch over a wireless network each said multimedia content as a multimedia stream transmitted over a secondary channel having a secondary bandwidth; wherein said content switch further includes:
a bandwidth scaler configured to scale each said primary primary_bit_rate multimedia stream transmitted at one said primary high bit rate over one said primary dedicated channel having one said primary bandwidth to a plurality K of secondary_bit_rate secondary multimedia sub-streams, K being an integer, wherein a first secondary_bit_rate secondary multimedia sub-stream has a first low bit rate, wherein a second secondary_bit_rate secondary multimedia sub-stream has a second low bit rate, and wherein a K-th secondary_bit_rate secondary multimedia sub-stream has a K-th low bit rate, and wherein each said secondary_bit_rate secondary multimedia sub-stream is substantially synchronized to one said primary primary_bit_rate multimedia stream;
and wherein at least one said multimedia smart terminal further includes:
a smart terminal sub-stream switch configured to switch between said plurality K of secondary_bit_rate secondary multimedia sub-streams in order to substantially minimize an error rate level determined at the time of reception of each said secondary_bit_rate secondary multimedia sub-stream.

28. A multicasting system for reception of real-time multimedia information, said system comprising:
a content switch coupled to a multimedia content source; wherein said multimedia content source includes a plurality N of multimedia contents, N being an integer, and wherein said content switch receives each said multimedia content as a primary multimedia stream transmitted at a primary bit rate over a primary dedicated channel having a primary bandwidth; and
at least one multimedia smart terminal, each said multimedia smart terminal configured to receive from said content switch over a network each said multimedia content as a multimedia stream transmitted over a secondary channel having a secondary bandwidth; wherein said content switch further includes:
a bandwidth scaler configured to scale each said primary primary_bit_rate multimedia stream transmitted at one said primary high bit rate over one said primary dedicated channel having one said primary bandwidth to a plurality K of secondary_bit_rate secondary multimedia sub-streams, K being an integer, wherein a first secondary_bit_rate secondary multimedia sub-stream has a first low bit rate, wherein a second secondary_bit_rate secondary multimedia sub-stream has a second low bit rate, and wherein a K-th secondary_bit_rate secondary multimedia sub-stream has a K-th low bit rate, and wherein each said secondary_bit_rate secondary multimedia sub-stream is substantially synchronized to one said primary primary_bit_rate multimedia stream;
and wherein at least one said multimedia smart terminal further includes:
a smart terminal sub-stream switch configured to switch between said plurality K of secondary_bit_rate secondary multimedia sub-streams in order to substantially minimize an error rate level determined at the time of reception of each said secondary_bit_rate secondary multimedia sub-stream.

29. A multicasting system for reception of multimedia information from a multimedia content source including a plurality N of multimedia contents, N being an integer; said system comprising:

a content switch means for receiving each said multimedia content transmitted as a primary multimedia stream at a primary bit rate over a primary dedicated channel having a primary bandwidth; and at least one multimedia smart terminal means for receiving from said content switch over a network each said multimedia content as a multimedia stream transmitted over a secondary channel having a secondary bandwidth; wherein said content switch means further includes:

a bandwidth scaling means for scaling each said primary primary bit rate multimedia stream transmitted at one said primary high bit rate over one said primary dedicated channel having one said primary bandwidth to a plurality K of secondary bit rate secondary multimedia sub-streams, K being an integer, wherein a first secondary bit rate secondary multimedia sub-stream has a first low bit rate, wherein a second secondary bit rate secondary multimedia sub-stream has a second low bit rate, and wherein a K-th secondary bit rate secondary multimedia sub-stream has a K-th low bit rate, and wherein said plurality K of secondary bit rate secondary multimedia sub-streams is substantially synchronized;

wherein at least one said multimedia smart terminal means further includes:

a smart terminal sub-stream switch means for switching between said plurality K of secondary_bit_rate secondary multimedia sub-streams in order to select a substantially optimum secondary_bit_rate secondary multimedia sub-stream having a substantially optimum low bit rate; wherein said substantially optimum secondary_bit_rate secondary multimedia sub-stream includes a substantially optimum relationship between an error rate level determined at the time of reception of said substantially optimum secondary_bit_rate secondary multimedia sub-stream and the quality of reception of a multimedia content supported by said substantially optimum secondary_bit_rate secondary multimedia sub-stream.

30. The system of claim 29; wherein said smart terminal sub-stream switch means further comprises:

a synchronous smart terminal sub-stream switch means for switching between said plurality K of secondary_bit_rate secondary multimedia sub-streams in order to select a substantially optimum secondary_bit_rate secondary multimedia sub-stream having a substantially optimum low bit rate; and for substantially synchronizing the timing of a transition between a preceding_optimum secondary_bit_rate secondary multimedia sub-stream and a subsequent_optimum secondary_bit_rate secondary multimedia sub-stream to the timing of a set of synchronizing data transmitted by each said secondary_bit_rate secondary multimedia sub-stream in order to substantially minimize the loss of data during said transition.

* * * * *